United States Patent Office 3,303,098
Patented Feb. 7, 1967

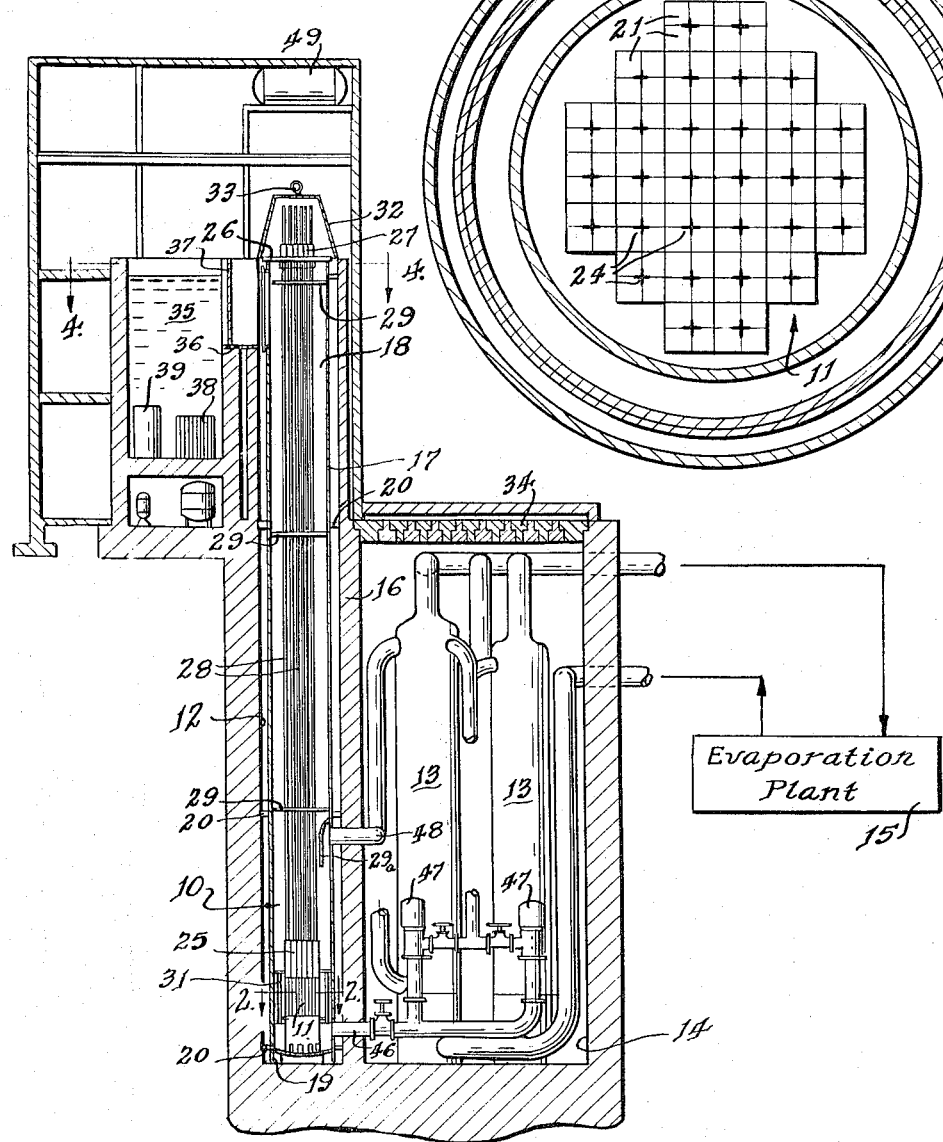

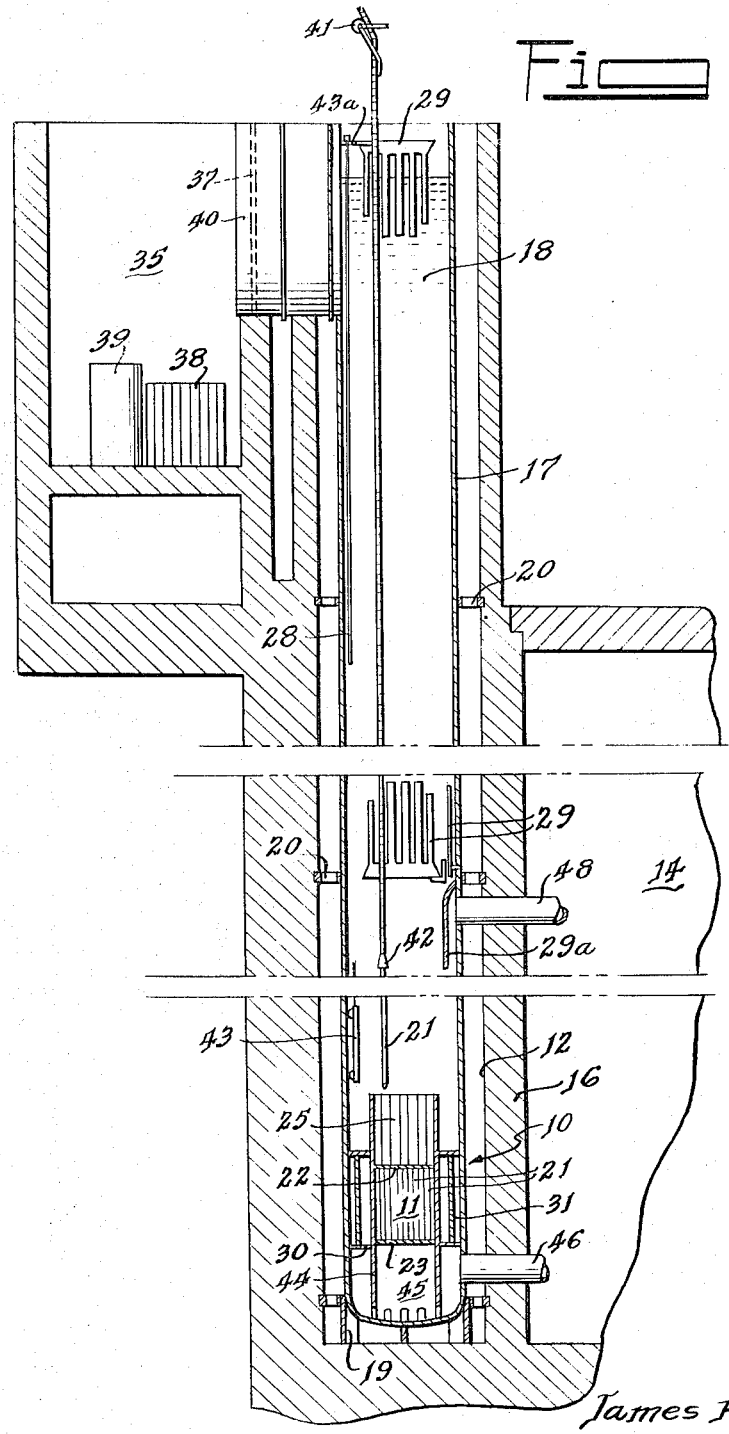

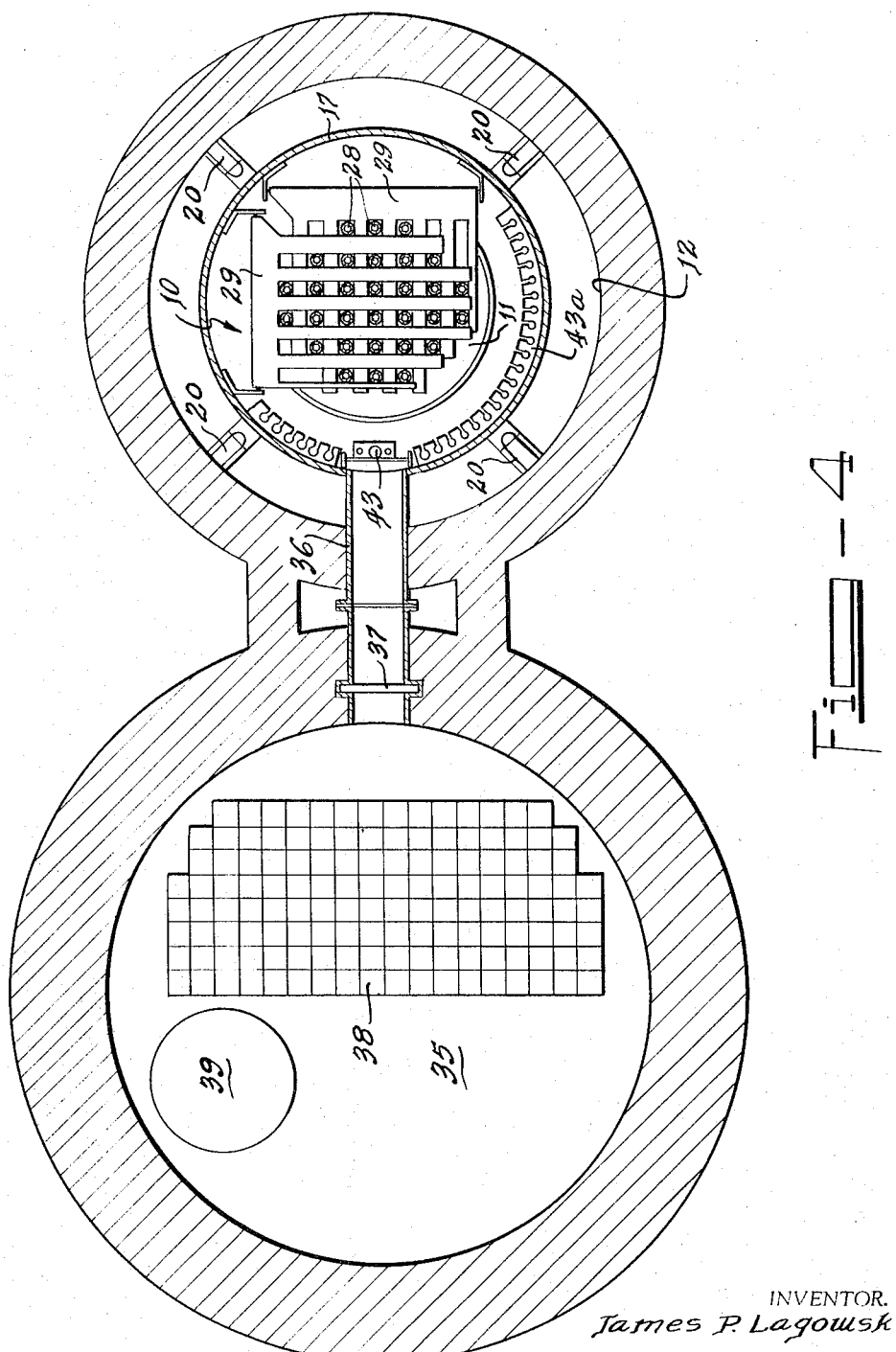

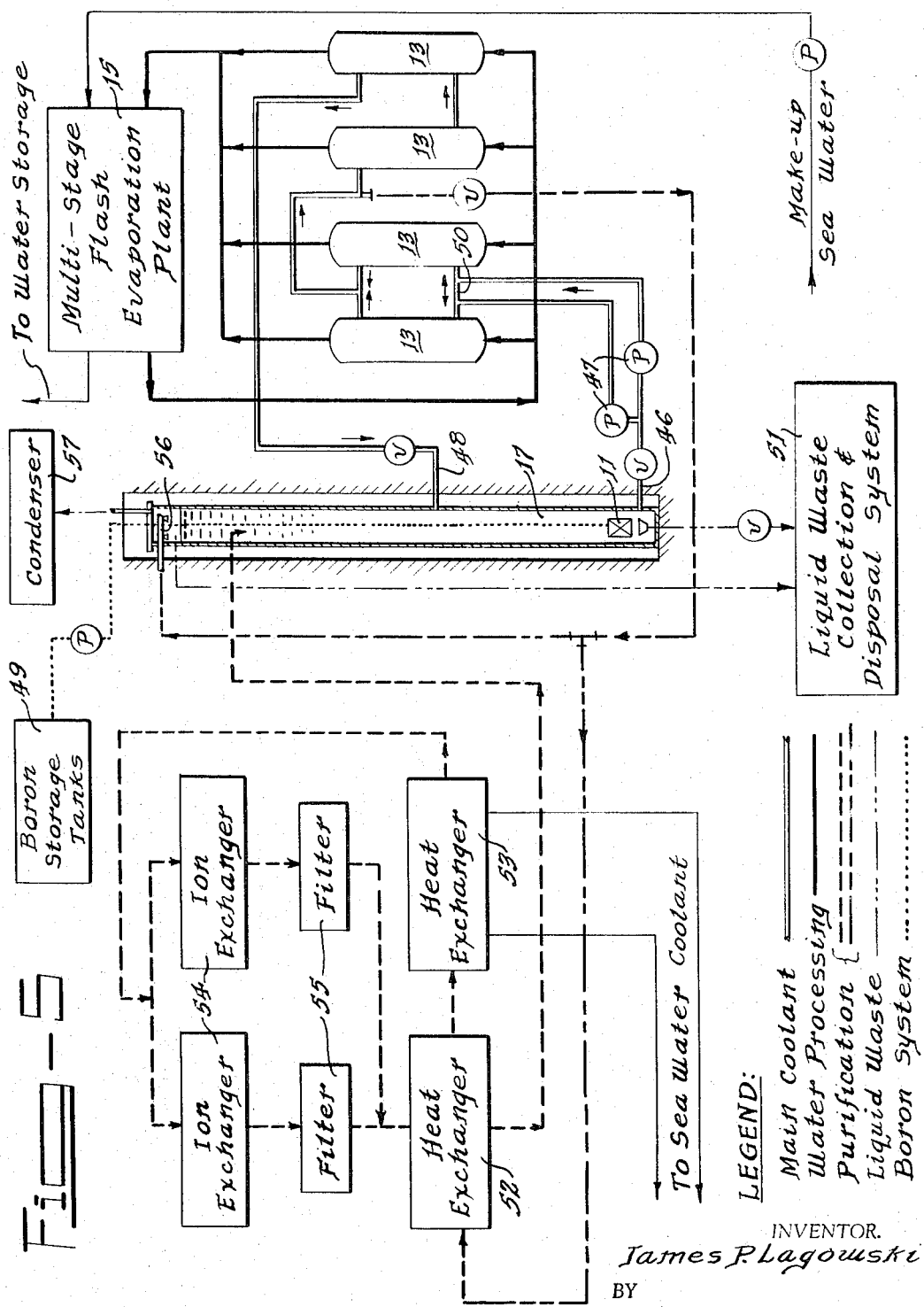

3,303,098
NUCLEAR-POWER SEA-WATER CONVERSION
PLANT
James P. Lagowski, Plainfield, Ill., assignor to the United
States of America as represented by the United States
Atomic Energy Commission
Filed July 19, 1965, Ser. No. 473,253
5 Claims. (Cl. 176—65)

The invention described herein was made in the course of, or under a contract with the United States Atomic Energy Commission.

This invention relates to a nuclear heat source which is inherently safe, simple in concept, economically attractive, and dependent only on known technology and to a method of operating the nuclear heat source. In more detail the invention relates to a nuclear-power sea-water distillation plant.

A great deal of effort is presently being expended throughout the world on developing new supplies of fresh water for municipal, industrial and agricultural uses. A major part of this effort has been expended on the desalination of sea water. While a number of different approaches are being investigated, one of the most promising employs a nuclear reactor to provide process heat for a flash distillation plant. While virtually any nuclear reactor could be used as the source of heat in a water desalting plant, simple coupling of an existing reactor concept with a flash distillation system has not shown promise for producing low cost water.

In order to produce water at competitive prices, the cost of heat supplied to the distillation plant must be substantially lower than the cost of steam from existing reactors. To reduce the cost of the heat supplied to the distillation plant, large multipurpose plants have been suggested and studies have shown that large dual-purpose, electric-power desalting plants have an economic advantage over single-purpose water plants because of credit from the electricity produced. However, review of those areas of the world requiring additional sources of water indicates that the demand for water is not always coupled to a demand for electric power in the amounts produced. Thus single-purpose water-only plants are required in areas of the world where additional large blocks of electric generating capacity are not desired and when the capital available for investment must be kept to a minimum.

It is accordingly the primary object of the present invention to develop a single-purpose plant for desalinating salt water at reduced cost.

It is also an object of the present invention to develop a nuclear-power sea-water distillation plant.

It is incidentally an object of the present invention to provide a novel method of operating a nuclear reactor.

These and other objects of the present invention are attained by coupling a liquid-cooled nuclear reactor, which is disposed at the bottom of a very deep pit containing the coolant, with a flash distillation plant. The depth of coolant above the reactor is sufficient to suppress boiling of the coolant at a temperature sufficiently high to operate the flash distillation plant.

This same distillation plant is very attractive for heavily built-up areas completely apart from the economic aspect because of its inherent safety. It is not seen that any conceivable sequence of events—not even a catastrophic earthquake—could release any large amount of radioactivity to the atmosphere. In view of this, the sea-water conversion plant is particularly attractive for an area subject to earthquake shocks, such as the southern California coast.

The invention will next be described in connection with the accompanying drawing wherein:

FIG. 1 is a diagrammatic vertical section of a nuclear-power sea-water distillation plant constructed in accordance with the present invention, FIG. 2 is an enlarged, horizontal section taken through the reactor core on the line 2—2 of FIG. 1, FIG. 3 is a diagrammatic vertical section of the plant while being refueled, FIG. 4 is an enlarged horizontal section taken on the line 4—4 in FIG. 1, and FIG. 5 is a simplied flow diagram of the plant.

Referring now to FIG. 1 of the drawing, the distillation plant according to the present invention comprises a nuclear reactor 10 including a core 11 disposed near the bottom of a deep concrete pit 12, a plurality of brine heaters 13 oriented vertically in another concrete pit 14 located adjacent to pit 12, and a multistage flash evaporation plant 15.

Concrete pits 12 and 14 are separated by a concrete wall 16 within a single 100-foot deep excavation. Pit 12 in addition to extending 100 feet below grade also extends 50 feet above grade. Reactor pit 12 is 15 feet in inside diameter and brine-heater pit 14 is 42 feet in inside diameter. The concrete walls of pits 12 and 14 are lined with carbon steel (not shown) to prevent leakage of ground water into the pits.

Reactor core 11 is disposed within a reactor tank 17 which is 150 feet high and 11 feet in inside diameter, has ⅜-inch thick carbon steel walls and is filled with a pool 18 of demineralized water. Tank 17 is supported from the bottom by skirt 19 while lateral supports 20 prevent lateral movement of the tank.

Reactor core 11 is conventional in nature and will not be described in great detail. In general, core 11 has an active height of 6½ feet and an active diameter (equivalent) of 6½ feet and includes 120 fuel assemblies 21 extending between an upper grid plate 22 and a lower grid plate 23. Fuel assemblies 21 are square in cross section, 5⅞ inches on a side. Fuel assemblies 21 each contain a plurality of Zircaloy-II-clad urnium-dioxide fuel rods. Thirty curciform control rods 24 containing $B_4C$ as the control material are sheathed in Inconel and are disposed at the intersections of groups of four fuel assemblies 21 on a 12-inch pitch (see FIG. 2). Control rods 24 extend through control rod guide shrouds 25 which are mounted on upper grid plate 22. The reactor also contains burnable poison as is conventional in the art.

Reactor tank 17 is covered by an air-tight lid 26 which prevents air from entering the main coolant system to reduce corrosion of the carbon steel used in construction. No pressurization is necessary, however, since the static head of more than 130 feet of water over the core is sufficient to prevent boiling.

Control rod drive mechanisms 27 are mounted on the top of reactor tank lid 26 and are attached to control rods 24 by 130-foot-long three-inch extension pipes 28. Retractable extension pipe lateral supports 29 (see FIGS. 3 and 4) include two sets of arms located at 90° to each other which fold against the reactor tank 17 during refueling operations and form a grid during reactor operation to provide lateral support for the extension pipes 28. This grid also serves to reduce somewhat the convective heat transfer to the surface of the reactor tank while baffle 29a deflects the main coolant flow downward.

Reactor core 11 is supported from reactor tank 17 by a circumferential flange 30 located near the bottom of the tank. Lead and steel shields 31 surrounding the core inside the reactor tank 17 are also supported by circumferential flange 30.

A steel cap 32 having a lifting hook 33 encloses control rod drive mechanisms 27 while covering reactor pit 12 and interlocking concrete beams 34 form a cover for brine-heater pit 14. Both cap 32 and concrete beams 34 provide some shielding and also serve as low leakage barriers to permit controlled ventilation of the pits.

A spent fuel pit 35, located above grade, is disposed adjacent to reactor pit 12 and is connected thereto by a 17-foot deep channel 36 which is closed during reactor operation by a removable gate 37. Fuel element storage racks 38 and spent fuel cask 39 are shown in spent fuel pit 35.

FIG. 3 shows the reactor plant as it apepars when refueling is being undertaken. Gate 37 has been removed from channel 36 and a refueling trough 40 connecting pit 35 and reactor tank 17 placed therein. Refueling is performed from the top of reactor tank 17 using hoist 41 and fuel removal tool 42 to raise the fuel elements to a point just above the reactor core. Underwater television cameras (not shown) are used to assist in locating the fuel removal tool 42 over a given fuel element. Refueling dolly 43 raises the assemblies the rest of the way to the top of reactor tank 17 and an auxiliary hoist (not shown) carries the element through trough 40 to spent fuel pit 35. Thus all fuel handling is carried out under water. During refueling control rod extension pipe lateral supports 29 are retracted against the side of reactor tank 17 and the control rod extension pipes 28 are disconnected from the control rods 24 and stored in racks 43a (see FIG. 4) located around the side of the reactor tank.

An outlet flow baffle 44 defines an outlet plenum 45. Outlet pipe 46 extends through wall 16 to two pumps 47 which draw the water from outlet plenum 45 and direct it upwardly through pipes (not shown) in brine heaters 13. The water is returned to reactor tank 18 above the reactor core 11 by return pipe 48.

Also shown in FIG. 1 is a tank 49 containing a solution of boron which may be injected in the coolant system in an emergency.

Operation of the plant will next be described with particular reference to FIG. 5 of the drawing. In operation, 400 Mwt. of heat generated in the core is removed by 40,000 g.p.m. of demineralized water flowing down through the core. The water enters the core 11 at 200° F. and exits at 270° F. Because of convection currents the bulk of the water in the reactor tank 17 is at 200° F. Flow is through a single outlet pipe 46 which is approximately four feet above the bottom of the reactor tank. From the reactor outlet the water flows to the suction of two coolant pumps 47 and from the pumps to a header 50 which distributes the water to two brine heaters 13 which operate in parallel. The divided flow merges at the exits of these brine heaters and then passes successively through a third and a fourth brine heater 13, emerging from the latter at a temperature of 200° F. Coolant then reenters tank 17 through a single inlet pipe 48 located about 40 feet above the tank bottom. Simultaneously sea water is being heated in brine heaters 13 and is then subjected to a series of flashings in flash evaporation plant 15 to obtain the product water. In brine heaters 13 reactor coolant flows in the shell and brine flows in the tubes. The design capacity of the plant is 50 million gallons of water per day.

All components of the primary coolant system are carbon steel except for the brine-heater tubes and tube sheets and pump and valve trim and fuel cladding. The brine-heater tubes and tube sheets are 70–30 cupronickel and the fuel cladding is a zirconium alloy.

A coolant overflow is located approximately three feet below the top of the reactor tank. A two-inch line feeds into a liquid radioactive waste collection and disposal system 51 which also collects liquid wastes from other overflows and drains. The total volume of the primary system is approximately 290,000 gallons.

Impurities are removed from the primary coolant system by removing coolant at a rate of 500 g.p.m. from the inlet of the second brine heater, passing the water through a first regenerative heat exchanger 52 which cools it to 150° F. and then a nonregenerative heat exchanger 53 which brings it down to 120° F. After passing through the heat exchangers the water passes through an ion exchange bed 54 and a filter 55 which removes impurities. Finally after passing back through regenerative heat exchanger 52, the water is returned to the primary system.

To deaerate the main coolant, coolant is tapped from the feed line to the primary coolant purification system. This water is sprayed into the reactor tank 17 above the coolant therein through spray header 56. Since this water is at a temperature of approximately 250° F., spraying it into the reactor tank causes a portion of it to flash to steam. Gases and water vapor in the top of the tank are bled off through a condenser 57 and the condensed water and non-condensed gases are directed to separate systems for disposal.

One great advantage of the plant is its safety. The physical arrangement of the reactor eliminates the possibility of uncovering the core in the event of a loss-of-coolant accident. Also the free volume of the pits is such that if the main coolant system is ruptured, the resulting level of coolant water in the pits would be well above the level of the core. Thus a complete loss-of-coolant accident is not possible and gross fuel melting cannot occur. Further, the large volume of the primary system provides a substantial "thermal flywheel" which will provide cooling for the core for many hours in the event of loss of flow or system rupture. Since the reactor system is essentially unpressurized, the reactor coolant contains relatively little stored energy, so that, in the event of a main coolant system rupture, only a small part of the coolant will flash to steam. Since the total volume of reactor coolant is large and a significant fraction of it is below boiling temperature, there is an appreciable interval of time before boiling will occur even with complete loss of coolant flow. In an emergency situation when no other means of heat removal can be provided, the coolant can be allowed to boil. Thus no significant amount of radioactivity would be released even under a severe accident condition. Furthermore, the reactor is located well below the ground water level so that even if a major catastrophe, such as an earthquake, should cause the pit walls to rupture, the core would remain covered with water.

It will be understood that the invention is not to be limited to the details given herein but that it may be modified within the scope of the appended claims.

The embodiments of the invention in which an exclusive property or privilege is claimed are defined as follows:

1. A method of operating a water-cooled nuclear reactor comprising circulating water directly from a reservoir through a reactor disposed at the bottom of the reservoir to an external heat exchanger without permitting the circulating water to mix with water in the reservoir and returning the water to the reservoir a short distance above the top of the reactor, the rate of circulation of the water being related to the power level of the reactor and the rate of heat removal at said heat exchanger such that the maximum temperature of the circulating water is substantially in excess of the boiling point of water at atmospheric pressure, and maintaining a sufficient depth of water in said reservoir above the reactor to suppress boiling of the water at said maximum temperature.

2. A method according to claim 1 wherein the maximum temperature of the circulating water is at least 270° F.

3. A nuclear-power sea-water distillation plant comprising a first deep pit, a reactor tank substantially filled with demineralized water in said pit, a nuclear reactor comprising a core having vertical coolant passages therein in communication with the demineralized water in the reactor tank and disposed in the reactor tank at more than 130 feet below the surface of the water, means for controlling the reactor, a second pit adjacent said first pit, a brine heater in said second pit, means for circulating demineralized water from the reactor tank below the bottom of the reactor core, through the brine heater and back to the reactor tank above the top of the reactor core, means for passing sea water trhough the brine heater in heat exchange relationship to the demineralized water passing therethrough, and a flash evaporator for distilling the heated sea water obtained from said brine heater.

4. A nuclear-power sea-water flash evaporation plant comprising a first concrete pit extending 100 feet below grade and 50 feet above grade, a 150-foot deep reactor tank substantially filled with demineralized water in said first concrete pit, a nuclear reactor comprising a core consisting of a plurality of fuel elements containing uranium dioxide having vertical coolant passages therein in communication with the water in the reactor tank and disposed in the reactor tank near the bottom thereof, means for controlling the reactor including a plurality of control rods, control rod mechanisms disposed above the top of the reactor tank, and control rod extension pipes connecting said control rods and said control rod mechanisms, a second concrete pit extending 100 feet below grade adjacent to said first concrete pit, a plurality of brine heaters vertically disposed in said second pit, a pair of pumps in said second pit for circulating demineralized water from the reactor tank below the bottom of the core through the brine heaters and back to the reactor tank above the top of the reactor core, means for passing sea water through the brine heaters in heat exchange relationship to the demineralized water passing therethrough, and a multistage flash evaporation plant for desalinating said heated brine.

5. A nuclear-power sea-water conversion plant including a nuclear reactor comprising a core having coolant passages therein, means for suppressing boiling of the coolant in said coolant passages at a temperature sufficiently high to operate a flash distillation plant for sea water comprising a deep pool of coolant extending above said reactor core, the coolant passages therein being in communication with the coolant in the pool, means for controlling the reactor, a brine heater, means for circulating coolant from said coolant passages through the brine heater and to the pool of coolant, means for passing sea water through said brine heater in heat exchange relationship to said coolant, and a flash evaporator for distilling the heated sea water obtained from said brine heater.

References Cited by the Examiner
UNITED STATES PATENTS

| | | | |
|---|---|---|---|
| 2,743,224 | 4/1956 | Ohlinger | 176—65 X |
| 2,806,819 | 9/1957 | Christy et al. | 176—44 |
| 2,870,076 | 1/1959 | Koch | 176—62 X |
| 3,032,482 | 5/1962 | Shoemaker | 203—10 |
| 3,194,740 | 7/1965 | Frisch | 176—64 |
| 3,214,348 | 10/1965 | Lichtenstein | 203—10 |
| 3,222,255 | 12/1965 | Maldague | 203—11 |
| 3,238,107 | 3/1966 | Leyse et al. | 176—62 |

OTHER REFERENCES

Nucleonics, vol. 20, December 1962, pp. 45–49.

References Cited by the Applicant
UNITED STATES PATENTS

| | | |
|---|---|---|
| 2,736,696 | 2/1956 | Wigner et al. |
| 2,856,339 | 10/1958 | Wigner et al. |

OTHER REFERENCES

Geneva Reports, vol. 10, pp. 224–231, 1958.

REUBEN EPSTEIN, *Primary Examiner.*